United States Patent
Blinn et al.

(10) Patent No.: US 8,509,856 B1
(45) Date of Patent: *Aug. 13, 2013

(54) SYSTEM AND METHOD FOR MOBILE DEVICE APPLICATION PRE-EMPTION

(75) Inventors: Benjamin Blinn, Leawood, KS (US); Allison A. DiMartino, Overland Park, KS (US); Harry Lai, Overland Park, KS (US); Brian R. Landers, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,123

(22) Filed: Apr. 24, 2012

Related U.S. Application Data (63) Continuation of application No. 12/628,879, filed on Dec. 1, 2009.

(51) Int. Cl.
*H04B 1/38* (2006.01)
*H04M 1/00* (2006.01)

(52) U.S. Cl.
USPC .......................... 455/567; 455/566; 455/550.1

(58) Field of Classification Search
USPC ........................................ 455/566, 567, 550.1
See application file for complete search history.

(56) References Cited

U.S. PATENT DOCUMENTS

| | | | |
|---|---|---|---|
| 4,241,236 A * | 12/1980 | Nash ............................ | 379/56.3 |
| 5,115,493 A * | 5/1992 | Jeanblanc et al. ............ | 358/1.18 |
| 6,690,778 B2 * | 2/2004 | Kahn ............................ | 379/110.01 |
| 6,782,281 B1 * | 8/2004 | Nagasawa .................... | 455/575.3 |
| 8,204,548 B1 | 6/2012 | Blinn et al. | |
| 2004/0100511 A1 * | 5/2004 | Wong et al. .................. | 345/866 |
| 2005/0250551 A1 * | 11/2005 | Helle ............................ | 455/567 |
| 2006/0030360 A1 | 2/2006 | Yeh | |
| 2007/0232273 A1 * | 10/2007 | Huang .......................... | 455/412.1 |
| 2008/0119248 A1 | 5/2008 | Nissen et al. | |
| 2009/0191920 A1 | 7/2009 | Regen et al. | |
| 2010/0322409 A1 * | 12/2010 | Haitani et al. ................ | 379/354 |

OTHER PUBLICATIONS

Pre-Interview Communication dated Nov. 9, 2011, U.S. Appl. No. 12/628,879, filed Dec. 1, 2009.
Notice of Allowance dated Feb. 17, 2012, U.S. Appl. No. 12/628,879, filed Dec. 1, 2009.
Supplemental Notice of Allowance dated Feb. 21, 2012, U.S. Appl. No. 12/628,879, filed Dec. 1, 2009.
Supplemental Notice of Allowance dated Feb. 28, 2012, U.S. Appl. No. 12/628,879, filed Dec. 1, 2009.
Blinn, Benjamin, et al., "System and Method for Mobile Device Application Pre-Emption", U.S. Appl. No. 12/628,879, filed Dec. 1, 2009.

* cited by examiner

*Primary Examiner* — Wesley Kim (57) ABSTRACT

A mobile device is provided. The mobile device comprises a wireless transceiver, a first application, a second application, and an interface. The wireless transceiver provides a wireless communication link to a communication network. The second application provides communication based on the wireless communication link. The interface presents, when the first application is active on the mobile device, an indication of a communication directed to the second application being received via the wireless communication link for less than 2 seconds before the second application pre-empts the first application.

17 Claims, 4 Drawing Sheets

SYSTEM AND METHOD FOR MOBILE DEVICE APPLICATION PRE-EMPTION

CROSS-REFERENCE TO RELATED APPLICATIONS

This application is a continuation of and claims priority under 35 U.S.C.§120 to U.S. patent application Ser. No. 12/628,879, filed on Dec. 1, 2009, entitled "System and Method for Mobile Device Application Pre-emption," by Benjamin Blinn, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a variety of mobile device applications, incoming communications can activate an application of the mobile device that is otherwise inactive. In such instances, a first application that is active can be pre-empted by a second application triggered by the incoming communication. When a user is actively engaged in the first application, for example, in the process of entering a text message, and an incoming communication triggers the second application, the sudden change of active application can be startling, and can also lead to the user entering text or commands that are inadvertently entered into the second application instead of the first application.

SUMMARY

In an embodiment, a mobile device is disclosed. The mobile device comprises a wireless transceiver, a first application, a second application, and an interface. The wireless transceiver provides a wireless communication link to a communication network. The second application provides communication based on the wireless communication link. The interface presents, when the first application is active on the mobile device, an indication of a communication directed to the second application being received via the wireless communication link for less than 2 seconds before the second application pre-empts the first application.

In an embodiment, a mobile device interface indication method is disclosed. The method comprises a wireless transceiver of a mobile device receiving a communication directed to a second application while a first application is active on the mobile device, the wireless transceiver to provide a wireless communication link to a mobile communication network. The method further comprises, in response to the wireless transceiver receiving the communication, an interface of the mobile device presenting at least one of a transient display dim and a transient vibration before redirecting inputs from the first application to the second application.

In an embodiment, a method is disclosed. The method comprises a mobile device receiving a communication from a mobile communication network directed to a second application on the mobile device. When a first application is active on the mobile device, the method further comprises the mobile device presenting an input dialog associated with the second application a first predefined time duration after the communication is received and the mobile device blocking input to the input dialog for a second predefined time duration after the input dialog is presented.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method are taught that provide a user of a mobile device notification of an imminent pre-emption of a first application by a second application. In an embodiment, the user of the mobile device may be notified of an imminent pre-emption of the first application by the second application by at least one of a screen dim, a keyboard backlight dim, an audio tone, a light-emitting diode (LED), a vibration, and an icon display. In an embodiment, a notification may be transient, of a given time period, and/or may be repeated in order to attract the attention of the user of the mobile device. In an embodiment, the pre-emption of the first application by the second application may proceed after a delay of a given time period. In an embodiment, the method may allow the user of the mobile device a given time period to prevent pre-emption of the first application by the second application by providing input. In an embodiment, the user of the mobile device may be provided with a given time period that allows for input to indicate a rejection of an event. In an embodiment, the method may block some inputs for a given time period. In one or more embodiments, a given time period may be one of a predetermined duration of time, a user-selected duration of time, or a duration of time based on a multiple of the average human-stimulus response time.

Figure 1:
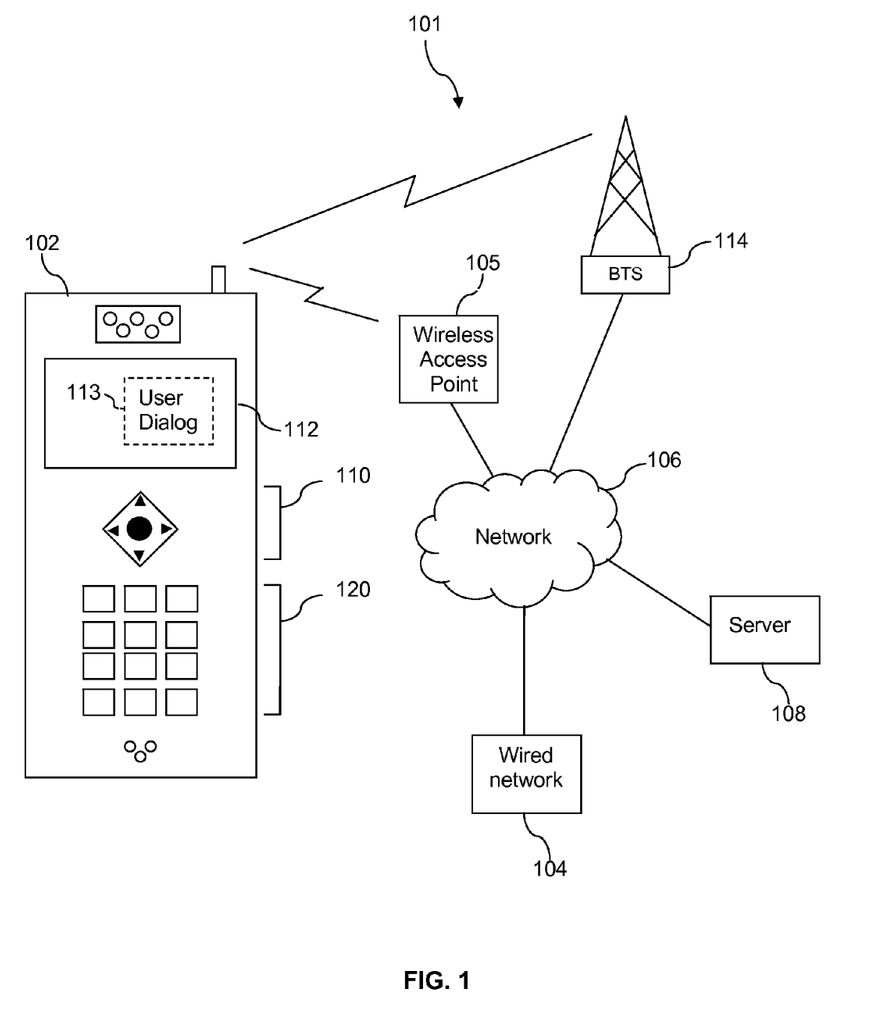
FIG. 1 illustrates a wireless communication system according to an embodiment of the disclosure.

Turning now to FIG. 1, a wireless communications system 101 and a mobile device 102 are illustrated. Though illustrated as a mobile phone, the mobile device 102 may take various forms including a wireless handset, a personal digital assistant (PDA), an inventory control device, a media player, and/or other devices. The mobile device 102 may support specialized activities such as gaming, inventory control, job control, task management functions, and so on.

The mobile device 102 includes a visual display 112, touch-sensitive surface and/or keys 120 for input by a user, and/or a button or set of buttons 110 for additional user interaction. In some instances, the mobile device 102 may combine user interaction features, such as visual display 112 and touch-sensitive surface 120 and/or other user interaction features. The mobile device 102 may present options for the user to select, controls for the user to actuate, and/or cursors or other indicators for the user to direct.

The mobile device 102 may further accept data entry from the user, including numbers to dial or various parameter values for configuring the operation of the mobile device 102. The mobile device 102 may further execute one or more software or firmware applications in response to user commands. The mobile device 102 also may activate an application that is otherwise triggered, for example, by an external method such as an incoming phone call, a calendar reminder, or other. These applications may configure the mobile device 102 to perform various customized functions in response to user interaction. Additionally, the mobile device 102 may be programmed and/or configured over-the-air, for example from a base transceiver station (BTS) 114, a wireless access point 105, a network 106, a peer mobile device 102, or any other wireless communication network or system.

The mobile device 102 may execute a web browser application which enables the display 112 to show a web page. The web page may be obtained via wireless communications with a BTS 114, a wireless access point 105, a network 106, a peer mobile device 102 or any other wireless communication network or system. In some contexts, a wireless communication network may be referred to as a mobile communication network or a communication network. While a single BTS 114 is illustrated, it is understood that the wireless communication system may comprise additional BTS's 114. In some instances, the mobile device 102 may be in communication with multiple BTS's 114 at the same time. The BTS 114 or network 106 is coupled to a wired network 104, such as the Internet. Via the wireless link and the wired network, the mobile device 102 has access to information on various servers, such as a server 108. The server 108 may provide content that may be shown on the display 112. Alternately, the mobile device 102 may access the BTS 114 through a peer mobile device 102 acting as an intermediary, in a relay type or hop type of connection. The mobile device 102 may communicate with the BTS 114 via one of a code division multiple access (CDMA) protocol, a global system for mobile communications (GSM) protocol, a long-term evolution (LTE) protocol, a worldwide interoperability for microwave access (WiMAX) protocol, and/or other wireless communication protocols. In some contexts, the BTS 114 and network 106 may be said to provide a mobile communication network.

In an embodiment, a first application may be active on the mobile device 102, when a second application may pre-empt the first application. For example, a first application may be receiving input from a user of the mobile device 102 when a second application becomes active based on a non-user initiated triggering event such as an incoming phone call. The present system provides a brief alert in advance of activating the second application and/or holds off directing user input to the second application for a short pre-defined duration of time. In an embodiment, when the first application is active on the mobile device 102 and when the BTS 114 pages the mobile device 102 to receive one of a voice call or a data call, the mobile device 102 may delay responding to the page from the BTS 114 while the brief alert is presented on the mobile device 102. Alternatively, in an embodiment, when the first application is active on the mobile device 102 and when the BTS 114 pages the mobile device 102 to receive one of a voice call or a data call, the mobile device 102 may respond to the page but mask or mute the ring of the voice call or delay the notification associated with accepting the data call. Incoming events on mobile devices 102 can lead to situations and/or complications not typically encountered with desktop computers, laptop computers, and/or notebook computers. For example, in the case of mobile phones, incoming messages such as phone calls may require user response within a finite time duration and/or maximum number of rings.

Mobile devices 102 may be limited in their ability to handle some situations due to limitations in display space, for example. In addition, mobile devices 102 may be subject to limitations resulting from the constraints of wireless communications. For example, mobile communications employ infrastructure that is put in place to facilitate wireless communication between mobile devices 102, and/or between mobile devices 102 and other entities such as servers 108 via networks 106. This infrastructure, which may include multiple components such as BTS 114, servers 108, wireless access points 105, and so on, may be designed to provide sufficient capacity to support a given amount of activity. It is therefore desirable to utilize this capacity efficiently so as to maximize utilization for cost-effectiveness of the infrastructure investment, while minimizing delays that may be experienced by users of mobile devices 102. Whereas in other systems, such as computers, which may not depend on communications via wireless networks such as 106, such considerations may not always be as important.

In an embodiment, the interface of the mobile device 102 provides an indication that the application that is active on the mobile device 102 is being pre-empted. The first application may be one of an email application, a short message service (SMS) application, a multimedia message service (MMS) application, a media player application, a browser application, a voice call application, an electronic game, or other. The second, pre-empting application may be one of a SMS application, a MMS application, a browser application, a voice call application, or other.

In an embodiment, the interface of the mobile device 102 presents a notification of the pre-emption and/or change by at least one of a screen dim, a keyboard backlight dim, an audio tone, an LED, a vibration, and an icon display. A screen dim notification and/or keyboard backlight dim notification may comprise a change of the intensity of the screen and/or keyboard of a predetermined intensity change for a predetermined time duration, followed by a return of the intensity of the screen and/or keyboard to its original, pre-notification level. An audio tone notification may be of a predetermined volume for a predetermined time duration. An LED notification may emit a steady or alternating illumination for a predetermined time duration and/or a predetermined number of alternating illuminations. A vibration notification may be of a predetermined intensity and/or a predetermined time duration. An icon notification may comprise a display of a predetermined icon in a predetermined location of the display for a predetermined time duration. In an embodiment, the indication of an incoming event may be transient, and may be of a duration that is between 200 milliseconds and one second. In an embodiment, the indication of an incoming event may be of a time duration that is some other time duration that may be effective to draw the attention of the user of the mobile device 102. In an embodiment, an indication of a pre-emption and/or change may be repeated one or more times.

In an embodiment, the second application may pre-empt the first application after a delay, wherein the delay may be of a duration such as 600 milliseconds after the indication. In an embodiment, the timing of this delay may be of a multiple of the time associated with human stimulus-response, for example 3 times the human stimulus-response time, 4.5 times the human stimulus-response time, or other multiple of the human stimulus-response time greater than 1.

In an embodiment, the method may block input that is intended for the first application, but which may inadvertently be directed to the second application when the second application pre-empts the first application. The duration of input blocking may be of a predetermined time between 300 milliseconds and 1200 milliseconds. The duration of the input blocking may be of another predetermined time associated with the human stimulus-response time. In an embodiment, the method may selectively block some forms of input and permit other forms of input. In an embodiment, input directed to a first application may be directed to a second application after a predetermined time, wherein the predetermined time may be one of a multiple of the average human stimulus-response time and shorter than four times the average human stimulus-response, or more than 300 milliseconds and less than 1200 milliseconds. In an embodiment, the method may incorporate both an indication of an incoming event and blocking of input.

In an embodiment, the method may allow the user of the mobile device 102 to prevent the second application pre-empting the first application and becoming active by rejecting the pre-emption. For example, the user may reject the pre-emption by operating a button 110 within a predetermined duration. The duration allowed for the rejection of the incoming event may be one of a fixed predetermined duration and a user-selected predetermined duration. In an embodiment, the predetermined duration allowed for the rejection of the incoming event may be less than 1 second.

Figure 2:
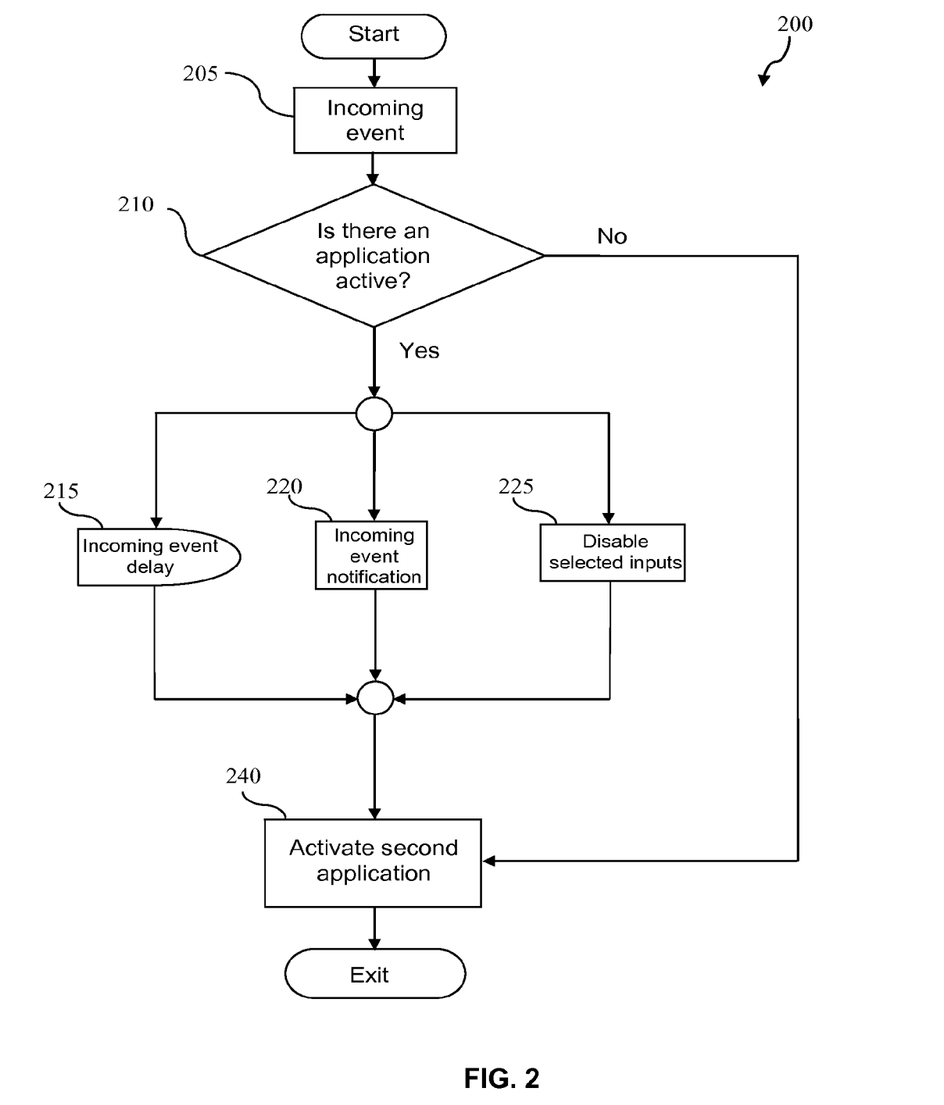
FIG. 2 illustrates a method according to an embodiment of the disclosure.

Turning now to FIG. 2, a method 200 is described. At block 205, a triggering event is experienced by the mobile device 102. In an embodiment, the triggering event causes an application to become active on the mobile device 102. In some contexts, this may be referred to as receiving an incoming event or experiencing an internally-generated event. For example, but not by way of limitation, a triggering event may be an incoming telephone call to the mobile device 102 via a communication from a communication network, for example a mobile communication network, that is directed to a voice communication application on the mobile device 102, which may be received via a wireless link with the BTS 114. Another example of a triggering event may be a reminder notification of a scheduled activity on a calendar.

At block 210, if a first application is active on the mobile device 102 when the triggering event is experienced by the mobile device 102, the method 200 proceeds to process block 215, block 220, and block 225 concurrently. If no application is active on the mobile device 102 when the triggering event is experienced by the mobile device 102, the processing proceeds to block 240 where the second application becomes active on the mobile device 102 and the method 200 exits.

At block 215, a predetermined delay may be provided before activating a second application, where the second application is associated with the triggering event. The predetermined delay duration may be determined based on an average human stimulus response time, for example three times an average human stimulus response time, four times an average human stimulus response time, or another duration effective to promote a user taking notice of the change from the first application being active, to the second application being active. The predetermined delay duration may alternatively be determined based on specified time durations, for example 500 milliseconds, 600 milliseconds, 700 milliseconds, or some other specified time duration. After the expiration of the predetermined delay, the second application may become active on the mobile device 102, for example the mobile device 102 may activate the voice communication application and present an input dialog associated with the voice communication application.

At block 220, a transient indication of the impending change from the first application being active to the second application being active is output by the mobile device 102. The transient indication may last for various time durations and may repeat in order to draw the attention of the user of the mobile device 102. In an embodiment, the transient indication may last about 200 milliseconds. In an embodiment, the transient indication may be defined based on an average human stimulus response time. In another embodiment, however, the transient indication may last a longer time duration. The transient indication may be provided by at least one of a screen dim, a keyboard backlight dim, audio tone, vibration, LED, and an icon display. In some contexts, the transient indication may be referred to as an event notification. The processing of block 215 and block 220 is conducted at least in part concurrently, although in an embodiment the processing of block 220 may complete before the processing of block 215 completes.

At block 225, an input of the mobile device 102 is temporarily blocked. For example, input from a keyboard 120 and/or other user interaction system of the mobile device 102 is temporarily blocked. In an embodiment, the input of the mobile device 102 may be blocked from the time the triggering event occurs, to a defined time duration after the second application becomes active. The temporary blocking of the input of the mobile device 102 may promote avoidance of input into the second application that is intended for the first application. Alternatively, the input of the mobile device 102 may be temporarily blocked from the time the second application becomes active, until a defined time duration after the second application becomes active. In another embodiment, the input of the mobile device 102 may be temporarily blocked for a period of time after the notification of the event that is a multiple of the average human response time but before activation of the second application. The multiple of the average human response time may be 1 or some other integer or fractional multiple of the average human response time. In an embodiment, selected keys, inputs, and/or other interaction systems of the mobile device 102 may remain available for use while the remaining inputs are blocked, for example one or more soft keys, fixed keys, and/or touchscreen keys. The unblocked input may promote the rejection of the change to the second application.

The processing of block 225 may be conducted at least in part concurrently with the processing of block 215 and block 220, although in an embodiment the processing of these three blocks may not overlap fully in time. After the processing associated with block 215, block 220, and block 225 is completed, the method 200 exits.

In an embodiment, at block 215, if an input is received by the mobile device 102 to prevent the second application pre-empting the first application, the method 200 exits without the second application becoming active and the first application remains active on the mobile device 102. In some contexts the input to prevent the second application pre-empting the first application may be referred to as a rejection input. In instances when the second application is rejected by the user of the mobile device 102, the mobile device 102 may log the event in such a manner as to allow the user to review the input at a later time.

While the descriptions above have been directed to the mobile device 102, in some embodiments the application pre-emption functionality may likewise provide some advantages for use on desktop computers, laptop computers, and/or tablet computers. One skilled in the art will readily appreciate that the above descriptions, with appropriate modifications, may be applied to translate the notification of imminent pre-emption of a first application by a second application to a desktop computer, a laptop computer, and/or a tablet computer. Computers are discussed in more detail below.

Figure 3:
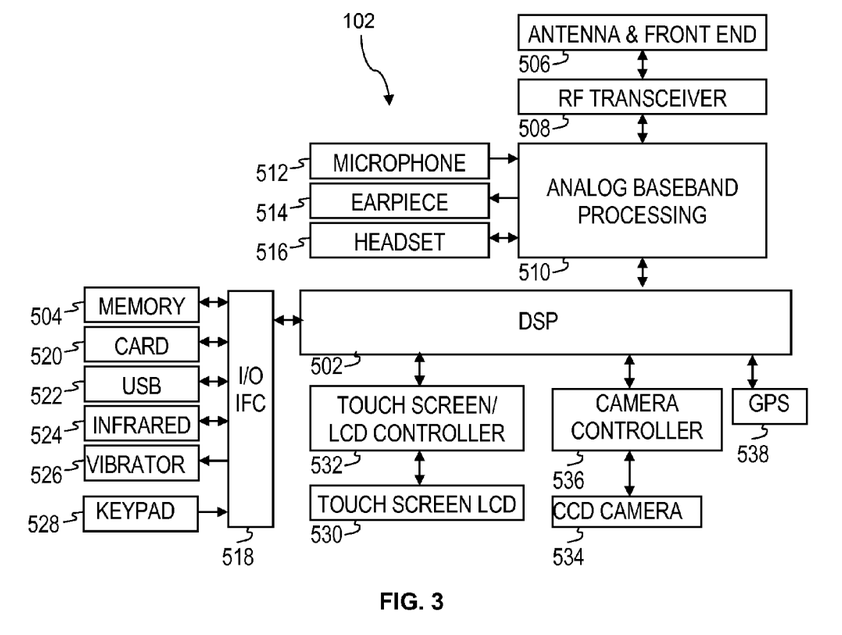
FIG. 3 illustrates a block diagram of a handset according to an embodiment of the disclosure.

FIG. 3 shows a block diagram of the mobile device 102. While a variety of known components of mobile device 102 are depicted, in an embodiment a subset of the illustrated components and/or additional components not illustrated may be included in the mobile device 102. In an embodiment, the mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may not comprise a keypad 528, for example when input is promoted by the touchscreen 532. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520. In addition, the DSP 502 may execute other applications made available via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting; converting received RF signals to baseband, and converting baseband transmit signals to RF. In some descriptions a radio transceiver or RF transceiver 508 may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby mobile device 102 and/or BTSs.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals also may be included to provide additional functions, e.g., radio and television reception.

Figure 4:
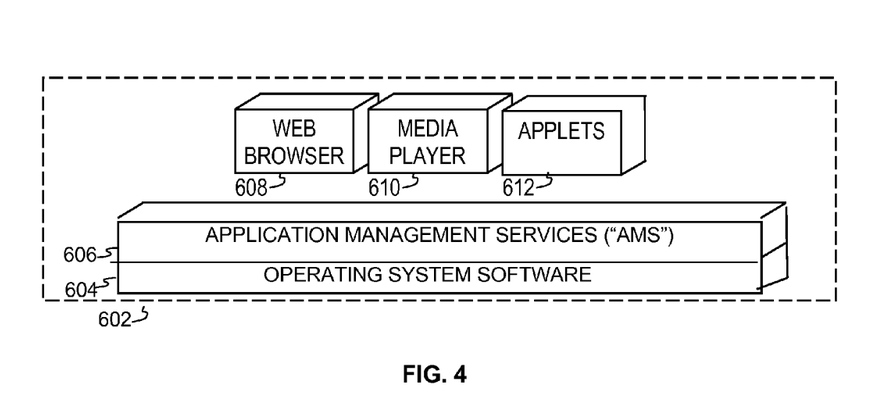
FIG. 4 illustrates a software environment according to an embodiment of the disclosure.

FIG. 4 illustrates a software environment 602 that may be implemented by the DSP 502. The DSP 502 executes operating system software 604 that provide a platform from which the rest of the software operates. The operating system software 604 provide drivers for the mobile device 102 hardware with standardized interfaces that are accessible to application software. The operating system software 604 include application management services ("AMS") 606 that transfer control between applications running on the mobile device 102. Also shown in FIG. 3 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 5:
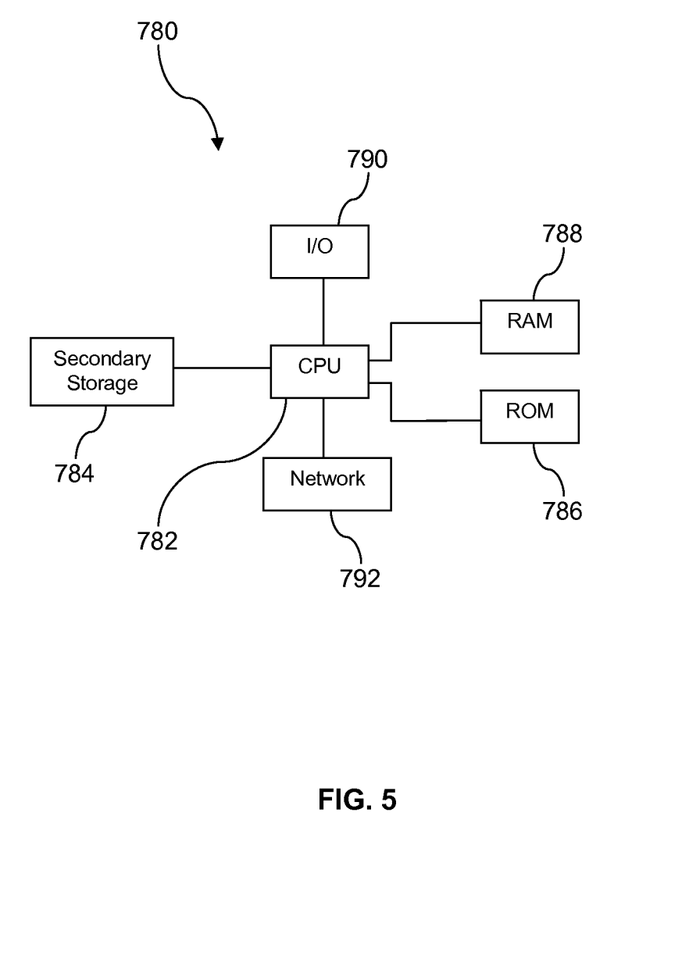
FIG. 5 illustrates a computer according to an embodiment of the disclosure.

FIG. 5 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device, comprising:
    a wireless transceiver to provide a wireless communication link to a communication network;
    an initially active application;
    a pre-empting application to provide communication based on the wireless communication link; and
    an interface to present an indication of a communication directed to the pre-empting application being received via the wireless communication link for less than 2 seconds before the pre-empting application pre-empts the initially active application, wherein the pre-empting application automatically pre-empts the initially active application without user action when no rejection user input is received before expiration of a predetermined time period after the indication, and wherein when the rejection user input is received after the communication and before the predetermined time period expires, the mobile device transmits a message to the communication network rejecting the communication.

2. The mobile device of claim 1, wherein the communication network is one of a code division multiple access (CDMA) network, a global system for mobile communications (GSM) network, a long-term evolution (LTE) network, and a worldwide interoperability for microwave access (WiMAX) network.

3. The mobile device of claim 1, wherein the initially active application is one of an email application, a short message service (SMS) application, a multimedia message service (MMS) application, a game application, a media player application, and a browser application.

4. The mobile device of claim 1, wherein the indication is at least one of a screen dim, a keyboard backlight dim, an audio tone, a light emitting diode (LED) illumination, and an icon display.

5. The mobile device of claim 4, wherein the indication comprises a screen dim and a keyboard backlight dim.

6. The mobile device of claim 5, wherein the screen dim and the keyboard backlight dim are presented for less than one second.

7. The mobile device of claim 5, wherein the screen dim and the keyboard backlight dim are presented for less than 200 milliseconds.

8. The mobile device of claim 7, wherein the pre-empting application pre-empts the initially active application no more than about 600 milliseconds after an initiation of the screen dim.

9. A mobile device interface application pre-emption indication method, the method comprising:
    initially activating, by a mobile device, an application;
    subsequently receiving, by a wireless transceiver of the mobile device, a communication directed to a pre-empting application, wherein the wireless transceiver provides a wireless communication link to a mobile communication network;
    in response to the wireless transceiver receiving the communication, presenting, by an interface of the mobile device, an indication of the communication before redirecting inputs from the initially active application to the pre-empting application, wherein the indication is at least one of a transient display dim and a transient vibration;
    automatically pre-empting the initially active application by the pre-empting application without user action when no rejection user input is received before expiration of a predetermined time period after the indication, wherein when the rejection user input is received by the interface after the communication and before expiration of the predetermined time period, the inputs to the interface are not redirected from the initially active application to the pre-empting application in response to receiving the communication; and the wireless transceiver transmitting a message to the mobile communication network cancelling the wireless communication link when the rejection user input is received by the interface.

10. The method of claim 9, wherein inputs are redirected from the initially active application to the pre-empting application a predetermined time after the communication is received, where the predetermined time is longer than an average time of human stimulus-response and less than four times the average time of human stimulus-response.

11. The method of claim 10, where the predetermined time is more than 300 milliseconds and less than 1200 milliseconds.

12. The method of claim 9, wherein the transient display dim and the transient vibration occur for less than about 200 milliseconds.

13. A method of providing notification of application pre-emption to a mobile device, the method comprising:

receiving, by a mobile device that comprises an initially active application, a communication from a mobile communication network directed to a pre-empting application on the mobile device;

subsequently presenting, by the mobile device, a transient indication of the communication;

automatically pre-empting the initially active application by the pre-empting application without user action when no rejection user input is received before expiration of a first predefined time duration after the transient indication; and in response to the automatic pre-emption, blocking, by the mobile device, some but not all input to the mobile device for a second predefined time duration after the pre-empting application becomes active to promote avoidance of input into the pre-empting application that is intended for the initially active application.

14. The method of claim 13, further comprising receiving, by the mobile device, a rejection user input after the communication and before the first predefined time duration passes; and in response to the rejection user input, transmitting, by the mobile device, a message to the mobile communication network rejecting the communication.

15. The method of claim 13, wherein the second predefined time duration is less than 1 second.

16. The method of claim 15, wherein the second predefined time duration is less than 200 milliseconds.

17. The method of claim 13, wherein the transient indication comprises dimming a display of the mobile device and dimming a keyboard of the mobile device for less than about 200 milliseconds and wherein the first predefined time period is about 600 milliseconds.

* * * * *